US011198425B2

United States Patent
Oohata

(10) Patent No.: US 11,198,425 B2
(45) Date of Patent: Dec. 14, 2021

(54) IGNITION DEVICE FOR INTERNAL COMBUSTION ENGINES, AND CONTROL DEVICE FOR VEHICLES

(71) Applicant: HITACHI AUTOMOTIVE SYSTEMS, LTD., Hitachinaka (JP)

(72) Inventor: Eiichirou Oohata, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 24 days.

(21) Appl. No.: 16/652,775

(22) PCT Filed: Oct. 15, 2018

(86) PCT No.: PCT/JP2018/038253
§ 371 (c)(1),
(2) Date: Apr. 1, 2020

(87) PCT Pub. No.: WO2019/087748
PCT Pub. Date: May 9, 2019

(65) Prior Publication Data
US 2020/0238972 A1  Jul. 30, 2020

(30) Foreign Application Priority Data

Oct. 31, 2017  (JP) .............................. JP2017-210396

(51) Int. Cl.
*B60W 20/20*  (2016.01)
*B60W 10/06*  (2006.01)
(Continued)

(52) U.S. Cl.
CPC ............ *B60W 20/20* (2013.01); *B60W 10/06* (2013.01); *B60W 10/08* (2013.01); *F02D 41/062* (2013.01);
(Continued)

(58) Field of Classification Search
CPC ...... B60W 20/20; B60W 10/06; B60W 10/08; B60W 2510/248; B60W 2555/20;
(Continued)

(56) References Cited

U.S. PATENT DOCUMENTS 4,825,826 A * 5/1989 Andres ................... F01M 5/00
                                                          123/196 S
10,704,525 B2 * 7/2020 Glugla ................... F02P 17/12
(Continued)

FOREIGN PATENT DOCUMENTS

JP      S61-202682 U    12/1986
JP      S62-20677 A      1/1987
(Continued)

OTHER PUBLICATIONS

International Search Report with English translation and Written Opinion issued in corresponding application No. PCT/JP2018/038253 dated Jan. 29, 2019.

*Primary Examiner* — Sizo B Vilakazi
(74) *Attorney, Agent, or Firm* — Foley & Lardner LLP

(57) ABSTRACT

An electrode of an ignition plug at the time of cooling start is heated to suppress generation of hydrocarbons at the time of cooling start of an internal combustion engine, and to reduce a production cost of an exhaust catalyst. Therefore, an ignition control unit 83 is provided to control a discharge of an ignition plug 200 provided in a cylinder 150. In a first combustion cycle after the operation of an internal combustion engine 100 is started, the ignition control unit 83 performs a discharge of the ignition plug 200 in a state where fuel in the cylinder 150 is not injected from a fuel injection valve 134 into the cylinder 150.

11 Claims, 12 Drawing Sheets

(51) Int. Cl.
  *B60W 10/08*   (2006.01)
  *F02D 41/06*   (2006.01)
  *F02D 41/38*   (2006.01)
  *F02P 9/00*    (2006.01)

(52) U.S. Cl.
  CPC ............... *F02D 41/38* (2013.01); *F02P 9/00* (2013.01); *B60W 2510/248* (2013.01); *B60W 2555/20* (2020.02); *F02D 2200/50* (2013.01); *F02D 2200/70* (2013.01)

(58) Field of Classification Search
  CPC .... F02D 41/062; F02D 41/38; F02D 2200/50; F02D 2200/70; F02P 9/00; F02P 3/04; F02P 5/1506; F02P 5/1504; F02P 5/045; Y02T 10/40
  See application file for complete search history.

(56) References Cited

U.S. PATENT DOCUMENTS

2011/0083498 A1\* 4/2011 Verner .................. F02D 35/023
                                            73/114.16
2018/0119665 A1\* 5/2018 Glugla .................... F02P 9/002

FOREIGN PATENT DOCUMENTS

| JP | H05-33698 A   | 2/1993  |
|----|---------------|---------|
| JP | 2008-284952 A | 11/2008 |
| JP | 2015-200249 A | 11/2015 |

\* cited by examiner

IGNITION DEVICE FOR INTERNAL COMBUSTION ENGINES, AND CONTROL DEVICE FOR VEHICLES

TECHNICAL FIELD

The present invention relates to an ignition device for an internal combustion engine and a control device for a vehicle.

BACKGROUND ART

In recent years, in internal combustion engines, there has been a demand for improved performance of exhaust catalysts (three-way catalysts) as exhaust gas regulations are tightened. Exhaust catalysts for internal combustion engines use expensive noble metals such as platinum. However, as exhaust gas regulations are tightened, it is necessary to use many noble metals to improve exhaust performance, and thus a production cost of the exhaust catalysts increases.

In this type of internal combustion engine, a large amount of hydrocarbon (Hydrocarbon: HC) is generated at the time of cooling start in which the temperature of the internal combustion engine is lower than the outside air temperature. Therefore, by suppressing the generation of hydrocarbons at the time of cooling start, the amount of noble metal used in the exhaust catalyst can be reduced, and the production cost of the exhaust catalyst can be reduced.

However, in the internal combustion engine, control for increasing the fuel injection amount at the time of cooling start is performed in order to prevent ignition failure of an ignition device (ignition plug) at the time of cooling start. As a result, the amount of hydrocarbons generated at the time of cooling start increases, and it becomes more difficult to reduce the cost of the exhaust catalyst.

PTL 1 discloses an engine ignition device that prevents the temperature of the ignition device from lowering by performing ignition of the ignition device at a timing (exhaust timing) different from a normal ignition timing in one combustion cycle of the internal combustion engine.

CITATION LIST

Patent Literature

PTL 1: JP 62-20677 A

SUMMARY OF INVENTION

Technical Problem

However, in the ignition device of the engine disclosed in PTL 1, after the temperature of the ignition plug of the internal combustion engine rises, the temperature of the ignition plug is prevented from decreasing, and a temperature rising is performed on the ignition device before the cooling start of the internal combustion engine is started. Therefore, generation of hydrocarbons at the time of cooling start of the internal combustion engine cannot be suppressed, and the production cost of the exhaust catalyst is hard to be reduced.

Accordingly, the invention has been made in view of the above problems, and an object thereof is to suppress the generation of hydrocarbons at the time of cooling start of an internal combustion engine and reduce the production cost of an exhaust catalyst.

Solution to Problem

In order to solve the above-mentioned problem, an ignition control unit that controls discharge of an ignition plug provided in a cylinder is provided, and the ignition control unit is configured to discharge the ignition plug before the operation of the internal combustion engine is started.

Advantageous Effects of Invention

According to this invention, generation of hydrocarbons at the time of the cooling start of an internal combustion engine can be suppressed, and the production cost of an exhaust catalyst can be reduced.

DESCRIPTION OF EMBODIMENTS

Hereinafter, an ignition device for an internal combustion engine and a method of controlling the ignition device according to the embodiment of the invention will be described.

Hereinafter, a control device 1 for an internal combustion engine according to an embodiment of the invention will be described. In the embodiment, the description will be given about a case where the control device 1 controls the discharge (ignition) of an ignition plug 200 provided in each cylinder 150 of a four-cylinder internal combustion engine 100.

Hereinafter, in the embodiment, a combination of some or all of the configurations of the internal combustion engine 100 and some or all of the configurations of the control device 1 will be referred to as the control device 1 of the internal combustion engine 100.

[Internal Combustion Engine]

Figure 1:
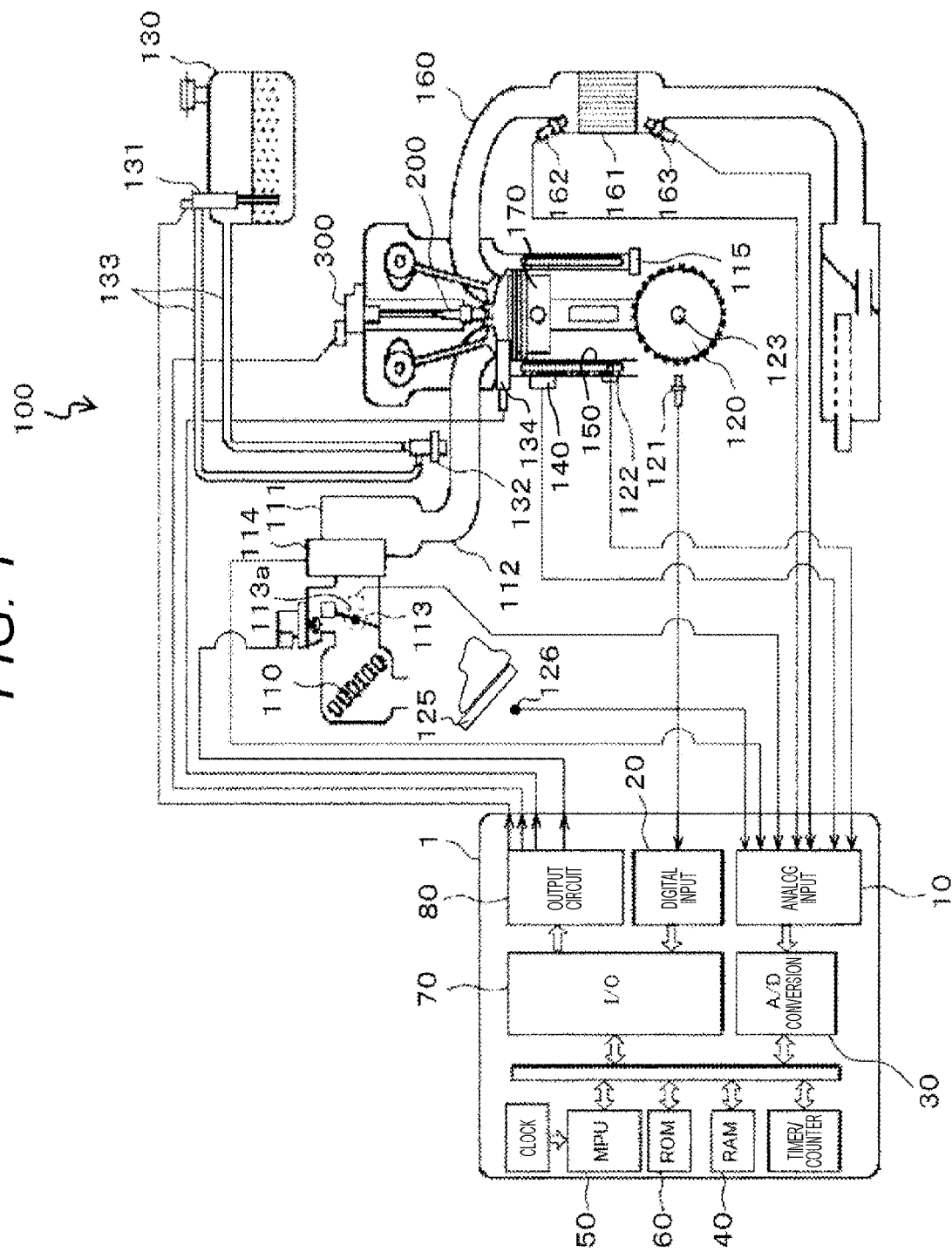
FIG. 1 is a diagram for describing a configuration of main parts of an internal combustion engine and a control device of the internal combustion engine according to an embodiment.

FIG. 1 is a diagram illustrating the configuration of main parts of the internal combustion engine 100 and the ignition device for an internal combustion engine.

Figure 2:
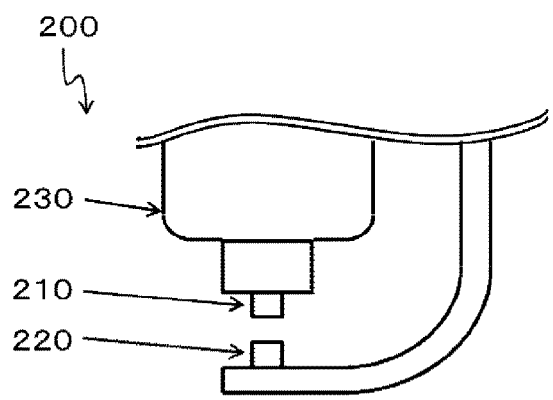
FIG. 2 is a partially enlarged view for describing an ignition plug.

FIG. 2 is a partially enlarged view illustrating electrodes 210 and 220 of the ignition plug 200.

In the internal combustion engine 100, air sucked from the outside flows through an air cleaner 110, an intake pipe 111, and an intake manifold 112, and flows into each cylinder 150. The amount of air flowing into each cylinder 150 is adjusted by a throttle valve 113, and the amount of air adjusted by the throttle valve 113 is measured by a flow sensor 114.

The throttle valve 113 is provided with a throttle opening sensor 113a for detecting the opening of the throttle, and opening information of the throttle valve 113 detected by the throttle opening sensor 113a is output to the control device (Electronic Control Unit: ECU) 1.

An electronic throttle valve driven by an electric motor is used as the throttle valve 113. However, any other types may be used as long as the air flow rate can be adjusted appropriately.

The temperature of the gas flowing into each cylinder 150 is detected by an intake air temperature sensor 115.

A crank angle sensor 121 is provided on the outer side in the radial direction of a ring gear 120 attached to a crankshaft 123, and the crank angle sensor 121 detects a rotation angle of the crankshaft 123. In the embodiment, the crank angle sensor 121 detects the rotation angle of the crankshaft 123 every 10° and every combustion cycle.

A water temperature sensor 122 is provided in a water jacket (not illustrated) of the cylinder head, and the water temperature sensor 122 detects the temperature of the cooling water of the internal combustion engine 100.

In addition, a vehicle is also equipped with an accelerator position sensor (APS) 126 that detects the amount of displacement (depression amount) of an accelerator pedal 125. The accelerator position sensor 126 detects a torque required by a driver. The driver-required torque detected by the accelerator position sensor 126 is output to the control device 1 described below. The control device 1 controls the throttle valve 113 on the basis of this required torque.

The fuel stored in a fuel tank 130 is sucked and pressurized by a fuel pump 131, then flows through a fuel pipe 133 provided with a pressure regulator 132, and is guided to a fuel injection valve (injector) 134. The fuel output from the fuel pump 131 is adjusted to a predetermined pressure by the pressure regulator 132 and injected into each cylinder 150 from the fuel injection valve (injector) 134. As a result of pressure adjustment by the pressure regulator 132, excess fuel is returned to the fuel tank 130 through a return pipe (not illustrated).

A cylinder head (not illustrated) of the internal combustion engine 100 is provided with a combustion pressure sensor (also referred to as a cylinder pressure sensor (CPS) or an in-cylinder pressure sensor) 140. The combustion pressure sensor 140 is provided in each cylinder 150 and detects the pressure (combustion pressure) in the cylinder 150.

The combustion pressure sensor 140 is a piezoelectric or gauge pressure sensor, and is configured to detect the combustion pressure (in-cylinder pressure) in the cylinder 150 over a wide temperature range.

Each cylinder 150 is provided with an exhaust manifold 160 that discharges the post-combustion gas (exhaust gas) to the outer side of the cylinder 150. A three-way catalyst 161 is provided on the exhaust side of the exhaust manifold 160, and the exhaust gas is purified by the three-way catalyst 161 and then discharged to the atmosphere.

An upstream air-fuel ratio sensor 162 is provided on an upstream side of the three-way catalyst 161. The upstream air-fuel ratio sensor 162 continuously detects the air-fuel ratio of the exhaust gas discharged from each cylinder 150.

A downstream air-fuel ratio sensor 163 is provided on a downstream side of the three-way catalyst 161. The downstream air-fuel ratio sensor 163 outputs a switch-like detection signal in the vicinity of the theoretical air-fuel ratio. In the embodiment, the downstream air-fuel ratio sensor 163 is an O2 sensor.

In addition, the ignition plug 200 is provided at the upper portion of each cylinder 150, and a spark ignites an air-fuel mixture in the cylinder 150 by the discharge (ignition) of the ignition plug 200. An explosion occurs in the cylinder 150 and a piston 170 is pushed down. When the piston 170 is pushed down, the crankshaft 123 rotates.

An ignition coil 300 that generates a voltage supplied to the ignition plug 200 is connected to the ignition plug 200, and the voltage generated by the ignition coil 300 causes discharging between a center electrode 210 and an outer electrode 220 of the ignition plug 200 (see FIG. 2).

As illustrated in FIG. 2, in the ignition plug 200, the center electrode 210 is supported in an insulated state by an insulator 230, and a predetermined voltage (20,000 V to 40,000 V in the embodiment) is applied to the center electrode 210.

The outer electrode 220 is grounded and, when a predetermined voltage is applied to the center electrode 210, discharge (ignition) occurs between the center electrode 210 and the outer electrode 220.

Further, in the ignition plug 200, a voltage at which discharge (ignition) occurs due to dielectric breakdown of the gas component varies depending on the state of gas existing between the center electrode 210 and the outer electrode 220 and the in-cylinder pressure. The voltage at which this discharge occurs is called a dielectric breakdown voltage.

The discharge control of the ignition plug 200 is performed by an ignition control unit 83 of the control device 1 described later.

Returning to FIG. 1, output signals from various sensors such as the throttle opening sensor 113a, the flow sensor 114, the crank angle sensor 121, the accelerator position sensor 126, the water temperature sensor 122, and the combustion pressure sensor 140 described above are output to the control device 1. The control device 1 detects the operating state of the internal combustion engine 100 on the basis of the output signals from these various sensors, and controls the amount of air flowing into the cylinder 150, a fuel injection amount, and an ignition timing of the ignition plug 200.

[Hardware Configuration of Control Device]

Next, the overall hardware configuration of the control device 1 will be described.

As illustrated in FIG. 1, the control device 1 includes an analog input unit 10, a digital input unit 20, an A/D (Analog/Digital) conversion unit 30, a RAM (Random Access Memory) 40, and an MPU (Micro-Processing unit) 50, a ROM (Read Only Memory) 60, an I/O (Input/Output) port 70, and an output circuit 80.

The analog input unit 10 includes analog output signals from various types of sensors such as the throttle opening sensor 113a, the flow sensor 114, the accelerator position sensor 126, the upstream air-fuel ratio sensor 162, the downstream air-fuel ratio sensor 163, the combustion pressure sensor 140, and the water temperature sensor 122.

The A/D conversion unit 30 is connected to the analog input unit 10. The analog output signals from various sensors input to the analog input unit 10 are subjected to signal processing such as noise removal, and then converted into digital signals by the A/D conversion unit 30 and stored in the RAM 40.

The digital output signal from the crank angle sensor 121 is input to the digital input unit 20.

The I/O port 70 is connected to the digital input unit 20, and the digital output signal input to the digital input unit 20 is stored in the RAM 40 via the I/O port 70.

Each output signal stored in the RAM 40 is processed by the MPU 50.

The MPU 50 executes a control program (not illustrated) stored in the ROM 60, thereby calculating the output signal stored in the RAM 40 according to the control program. The MPU 50 calculates a control value that defines the operation amount of each actuator (for example, the throttle valve 113, the pressure regulator 132, the ignition plug 200, etc.) that drives the internal combustion engine 100 according to the control program, and temporarily stores the control value in the RAM 40.

The control value that defines the operation amount of the actuator stored in the RAM 40 is output to the output circuit 80 via the I/O port 70.

The output circuit 80 is provided with a function of an ignition control unit 83 (see FIG. 3) that controls a voltage applied to the ignition plug 200.

[Functional Block of Control Device]

Next, the functional configuration of the control device 1 will be described.

Figure 3:
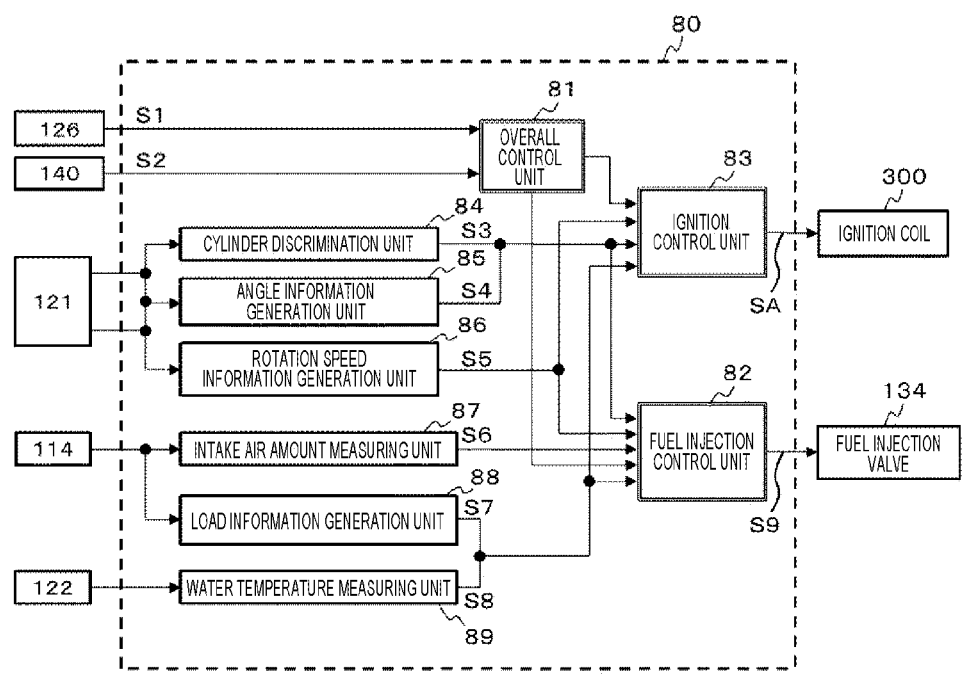
FIG. 3 is a functional block diagram illustrating a functional configuration of the control device.

FIG. 3 is a functional block diagram illustrating the functional configuration of the control device 1. Each function of the control device 1 is realized by the output circuit 80 by the MPU 50 executing the control program stored in the ROM 60.

As illustrated in FIG. 3, the output circuit 80 of the control device 1 includes an overall control unit 81, a fuel injection control unit 82, and the ignition control unit 83.

The overall control unit 81 is connected to the accelerator position sensor 126 and the combustion pressure sensor 140 (CPS), and receives a required torque (acceleration signal S1) from the accelerator position sensor 126 and the output signal S2 from the combustion pressure sensor 140.

The overall control unit 81 performs overall control of the fuel injection control unit 82 and the ignition control unit 83 on the basis of the required torque (acceleration signal S1) from the accelerator position sensor 126 and the output signal S2 from the combustion pressure sensor 140.

The fuel injection control unit 82 is connected to a cylinder discrimination unit 84 that discriminates each cylinder 150 of the internal combustion engine 100, an angle information generation unit 85 that measures the crank angle of the crankshaft 123, and a rotation speed information generation unit 86 that measures the engine speed, and receives cylinder discrimination information S3 from the cylinder discrimination unit 84, crank angle information S4 from the angle information generation unit 85, and engine rotation speed information S5 from the rotation speed information generation unit 86.

Further, the fuel injection control unit 82 is connected to an intake air amount measuring unit 87 that measures the amount of air taken into the cylinder 150, a load information generation unit 88 that measures the engine load, and a water temperature measuring unit 89 which measures the temperature of an engine coolant, and receives intake air amount information S6 from the intake air amount measuring unit 87, engine load information S7 from the load information generation unit 88, and coolant temperature information S8 from the water temperature measuring unit 89.

The fuel injection control unit 82 calculates the fuel injection amount injected from the fuel injection valve 134 and the injection time (fuel injection valve control information S9) on the basis of the received information, and controls the fuel injection valve 134 on the basis of the calculated fuel injection amount and calculated injection time.

In addition to the overall control unit 81, the ignition control unit 83 is connected to the cylinder discrimination unit 84, the angle information generation unit 85, the rotation speed information generation unit 86, the load information generation unit 88, and the water temperature measuring unit 89, and receives information therefrom.

Based on the received information, the ignition control unit 83 calculates the amount of current (energization angle) for energizing a primary coil 310 of the ignition coil 300, an energization start time, and a time (ignition time) to cut off the current for energizing the primary coil 310.

The ignition control unit 83 controls discharging by the ignition plug 200 by outputting an ignition signal S to the primary coil 310 of the ignition coil 300 on the basis of the calculated energization amount, energization start time, and ignition time.

Further, at least the ignition plug 200, the ignition coil 300, and the ignition control unit 83 described above are included, and the function of the ignition control unit controlling the ignition of the ignition plug 200 corresponds to an ignition device for an internal combustion engine of the invention.

Here, at the time of cooling start of the internal combustion engine 100, the air-fuel ratio required for ignition (the more the fuel needs to be concentrated) is necessarily lowered as the temperature of the electrode of the ignition plug 200 is lowered.

Figure 4:
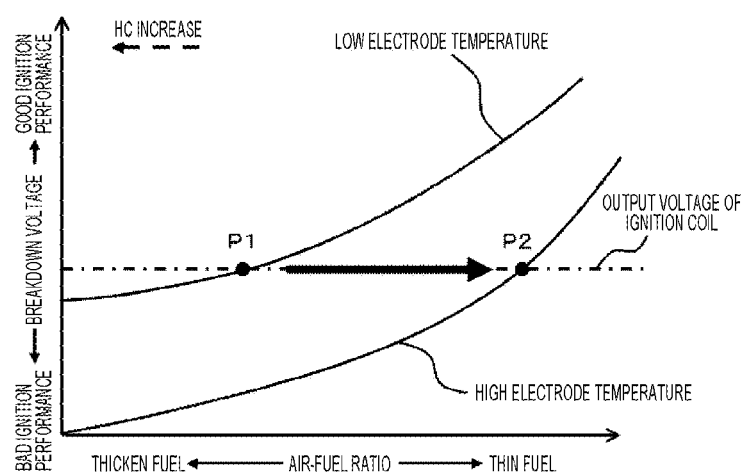
FIG. 4 is a diagram for describing a relation among an electrode temperature, a dielectric breakdown voltage, and an air-fuel ratio.

FIG. 4 is a diagram for describing a relation among an electrode temperature, a dielectric breakdown voltage, and an air-fuel ratio.

As illustrated in FIG. 4, in the internal combustion engine 100, as the air-fuel ratio (the thinner the fuel) becomes large, flaming of the air-fuel mixture by discharging (ignition) hardly occurs. Therefore, there is a need to increase the dielectric breakdown voltage for igniting the air-fuel mixture.

In a case where the dielectric breakdown voltage is constant (the output current of the ignition coil 300 is constant), the breakdown voltage cannot be exceeded unless the air-fuel ratio is reduced (the fuel is thickened) as the temperature of the electrode of the ignition plug 200 decreases. As a result, in the internal combustion engine 100, the generation of hydrocarbons (HC) during combustion increases as the proportion of fuel in the air-fuel mixture increases.

In other words, as the temperature of the electrode of the ignition plug 200 at the start of the cold operation is increased (see the thick arrow in FIG. 4), the dielectric breakdown voltage can be exceeded even when the air-fuel ratio is increased (the fuel is thinned), and the hydrocarbons during combustion can be reduced. Therefore, in the internal combustion engine 100, the temperature of the electrode of the ignition plug 200 at the time of cooling start is increased before discharging (ignition), so that the air-fuel ratio at the time of cooling start can be increased, and the generation of hydrocarbons (HC) can be suppressed.

In the example illustrated in FIG. 4, in a case where the electrode temperature of the ignition plug 200 is low, the air-fuel ratio for igniting at a predetermined dielectric breakdown voltage is P1. In a case where the electrode temperature is high, the air-fuel ratio for igniting at a predetermined dielectric breakdown voltage becomes P2. Therefore, as the electrode temperature increases, the fuel required for ignition can be made thinner, and the amount of hydrocarbons (HC) generated by combustion decreases.

[Method of Heating Ignition Plug]

Next, a method of heating the electrodes of the ignition plug 200 by the ignition control unit 83 according to the embodiment will be described.

Figure 5:
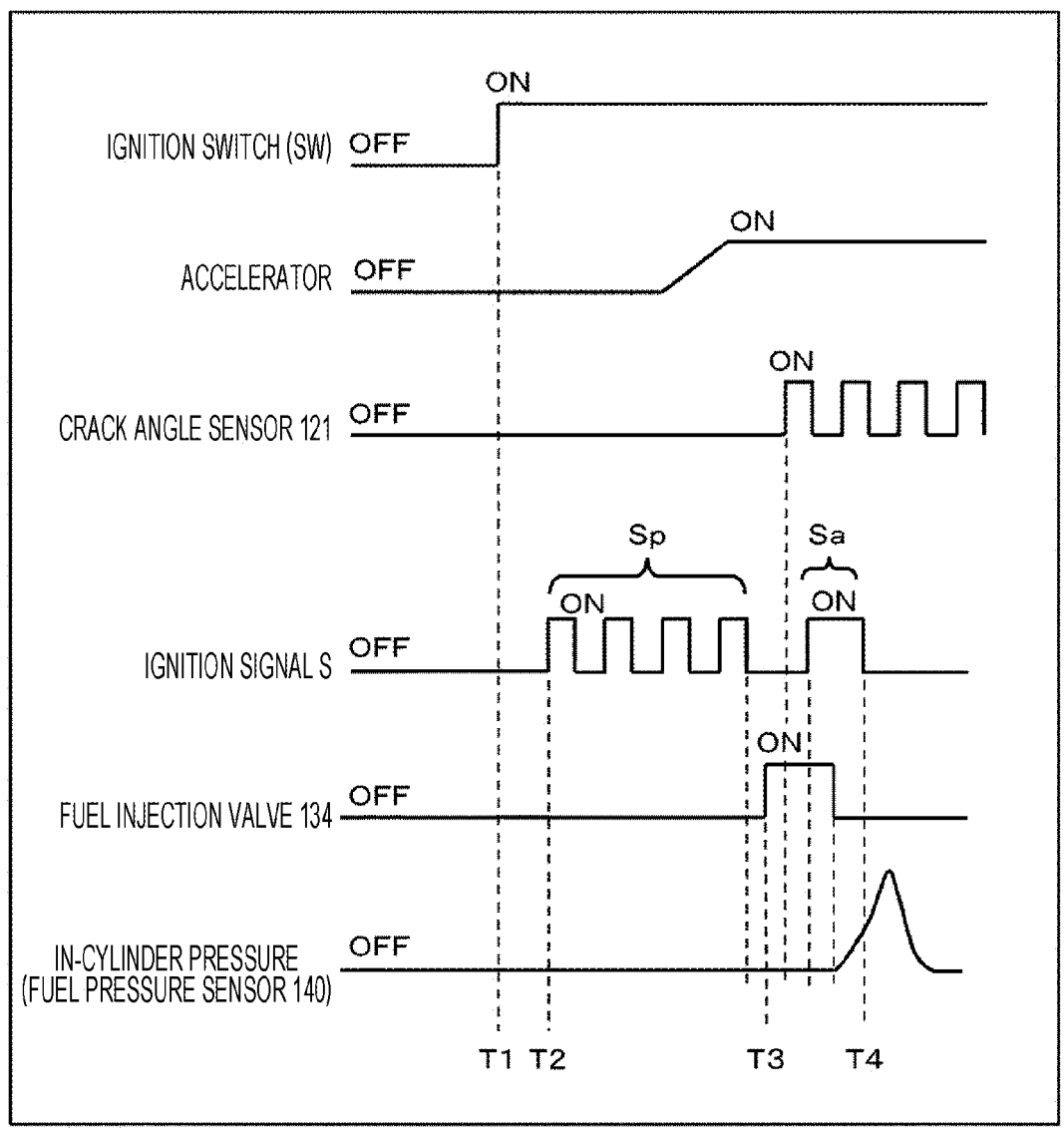
FIG. 5 is an example of a timing chart illustrating an output timing of an ignition signal according to the embodiment.

FIG. 5 is an example of a timing chart illustrating the output timing of the ignition signal S output from the ignition control unit 83.

In FIG. 5, the uppermost row illustrates ON/OFF signal of an ignition switch SW of a vehicle (not illustrated). The ignition switch SW is turned on by inserting a key (not illustrated) into a key cylinder (not illustrated) and turning it (or by turning on a start button in the case of a keyless device).

The second row from the top illustrates the output signal of the crank angle sensor 121. After the ignition switch SW is turned on and the rotation of the crankshaft 123 starts to be detected by the crank angle sensor 121 with the start of the movement of the internal combustion engine 100, the output of the crank angle sensor 121 is turned on.

The third row from the top illustrates the ignition signal S output from the ignition control unit 83 to the ignition coil 300. The ignition signal S includes a preliminary ignition signal Sp and an ignition signal Sa output after the preliminary ignition signal Sp. The preliminary ignition signal Sp is a preliminary ignition performed before the discharge (ignition) for combustion (ignition to the air-fuel mixture) in the combustion stroke in order to raise the temperature of the ignition plug 200 before the cooling start (hereinafter, referred to as preliminary discharge). The ignition signal Sa is an ignition signal performed for combustion (ignition of the air-fuel mixture) in the combustion stroke.

In the embodiment, the ignition control unit 83 outputs an ignition signal Sa for generating a discharge (ignition) in the ignition plug 200 in a combustion stroke in a combustion cycle, and a preliminary ignition signal Sp for generating a discharge (ignition) in the ignition plug 200 to the ignition coil 300.

As illustrated in FIG. 5, the preliminary ignition signal Sp includes a plurality of number of outputs generated after time T1 when the ignition switch SW is turned on, before time T2 when the signal is output from the crank angle sensor 121, and before time T3 when the fuel injection is performed from the fuel injection valve 134. In other words, the preliminary ignition signal Sp is output a plurality of times before the first explosion in each cylinder 150.

Here, the first explosion means the first combustion (explosion) in the first combustion stroke of each cylinder 150 after the operation of the internal combustion engine 100 starts. In other words, in the internal combustion engine 100, after the start of operation, the first explosion occurs only once in each cylinder 150, and thereafter, a predetermined combustion cycle (intake stroke→compression stroke→combustion stroke→exhaust stroke→intake stroke) is repeated.

The preliminary ignition signal Sp is a signal that makes the voltage change in the ignition coil 300 smaller than the ignition signal Sa for combustion (ignition to the air-fuel mixture), and is generated in the ignition coil 300 by the preliminary ignition signal Sp. The voltage is set to be lower than the dielectric breakdown voltage.

The ignition control unit 83 outputs the preliminary ignition signal Sp a plurality of times, so that a discharge is generated in the ignition coil 200 based on the preliminary ignition signal Sp, and the discharge of the ignition coil 200 causes the ignition coil 200 (the center electrode 210 and the outer electrode 220) to be heated (hereinafter, this may be referred to as preheating).

Therefore, in the ignition plug 200 according to the embodiment, the electrode of the ignition plug 200 is heated (preliminarily overheated) by the plurality of number of preliminary discharges before the first explosion until the discharge (ignition) of the ignition plug 200 in the combustion stroke. As a result, as described above, even if the air-fuel ratio at the time of discharge (ignition) of the ignition coil 200 in the combustion stroke is increased (the fuel is thinned), generation of hydrocarbons (HC) due to combustion at the time of cooling start can be suppressed.

Next, the fourth row from the top indicates ON/OFF signal of the fuel injection valve 134. When the fuel injection valve 134 is turned on, a predetermined amount of fuel is injected from the fuel injection valve 134 into the cylinder 150 (combustion chamber). Thereafter, based on the ignition signal Sa for combustion output from the ignition control unit 83, the air-fuel mixture in the cylinder 150 (combustion chamber) burns, and the pressure in the cylinder 150 sharply increases.

The bottom row illustrates the in-cylinder pressure in the cylinder 150 (combustion chamber). The in-cylinder pressure is measured by the combustion pressure sensor 140, and the measurement result of the combustion pressure sensor 140 is output. As described above, in the internal combustion engine 100, after a predetermined amount of fuel is injected from the fuel injection valve 134 to generate an air-fuel mixture in the combustion chamber, the air-fuel mixture is ignited at the timing (time T4) when the ignition signal Sa is turned off so as to generate combustion. The combustion pressure sensor 140 measures the in-cylinder pressure in the combustion cycle.

[Control Method of Ignition Device]

Next, an example of a method of controlling the ignition device by the ignition control unit 83 will be described.

Figure 6:
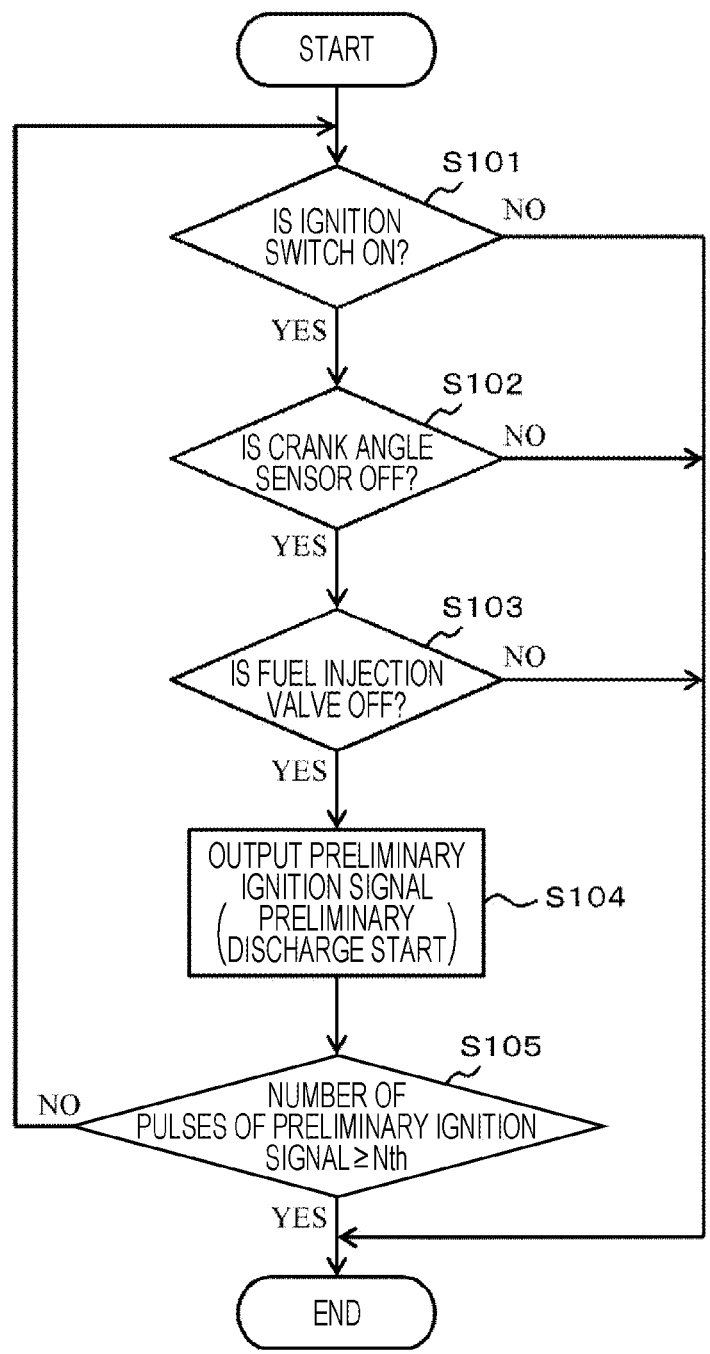
FIG. 6 is an example of a flowchart illustrating a method of controlling an ignition device by an ignition control unit.

FIG. 6 is an example of a flowchart illustrating a method of controlling the ignition device by ignition control unit 83.

As illustrated in FIG. 6, in Step S101, the ignition control unit 83 determines whether the ignition switch SW is ON. In a case where it is determined that the ignition switch SW is ON (Step S101: YES), the process proceeds to Step S102. In a case where it is determined that the ignition switch is not ON (OFF) (Step S101: NO), the process ends.

In Step S102, in a case where the ignition control unit 83 determines whether the output value of the crank angle sensor is OFF, and the output value is OFF (Step S102: YES), the process proceeds to Step S103. In a case where it is determined that the output is not OFF (ON) (Step S102: NO), it is determined that the cylinder 150 is not the first explosion, and the process ends.

In Step S103, the ignition control unit 83 determines whether the fuel injection valve 134 is OFF. In a case where it is determined that the fuel injection valve 134 is OFF (Step S103: YES), the process proceeds to Step S104. In a case where it is determined that the fuel injection valve is not OFF (ON) (Step S103: NO), the process ends.

In Step S104, the ignition control unit 83 outputs the preliminary ignition signal Sp to the ignition coil 300 a plurality of times, and the process proceeds to Step S105.

In Step S105, the ignition control unit 83 determines whether the number of pulses of the preliminary ignition signal Sp is equal to or greater than a predetermined threshold Nth. In a case where it is determined that the number of pulses of the preliminary ignition signal Sp is equal to or greater than the threshold Nth (Step S105: YES), it is determined that the ignition plug 200 has been heated to the predetermined temperature, and the process ends. In a case where the ignition control unit 83 determines that the number of pulses of the preliminary ignition signal Sp is less than the threshold value Nth (Step S105: NO), the process returns to Step S101 and repeats the processes of steps S101 to S105.

As described above, in the embodiment, the ignition control unit 83 is provided to control the discharge of the ignition plug 200 provided in the cylinder 150. In the first combustion cycle after the operation of the internal combustion engine 100 is started, the ignition control unit 83 performs a discharge of the ignition plug 200 in a state where fuel in the cylinder 150 is not injected from the fuel injection valve 134 into the cylinder 150.

With this configuration, the ignition plug 200 can be overheated by discharging the ignition plug 200 before fuel injection in the first combustion cycle after the operation of the internal combustion engine 100 is started, so that the hydrocarbon (HC) at the time of cooling start can be suppressed.

In addition, in the first combustion cycle after the start of operation of the internal combustion engine 100, the ignition control unit 83 performs a discharge of the ignition plug 200 a plurality of times in a state where fuel is not injected from the fuel injection valve 134 into the cylinder 150.

With this configuration, the ignition plug 200 is discharged a plurality of times before the fuel injection in the first combustion cycle after the operation of the internal combustion engine 100 is started, so that the ignition plug 200 can be reliably overheated. The generation of hydrocarbons (HC) at the time of cooling start can be reliably suppressed.

Second Embodiment

Next, an ignition device for an internal combustion engine according to a second embodiment will be described.

In the above-described embodiment, the case where the ignition control unit 83 outputs the preliminary ignition signal Sp after the ignition switch SW is turned on by the driver has been described as an example. However, before the ignition switch SW is turned on, the operation of the vehicle may be detected in advance in the near future, and the preliminary ignition signal Sp may be output at an earlier timing based on the detection.

Figure 7:
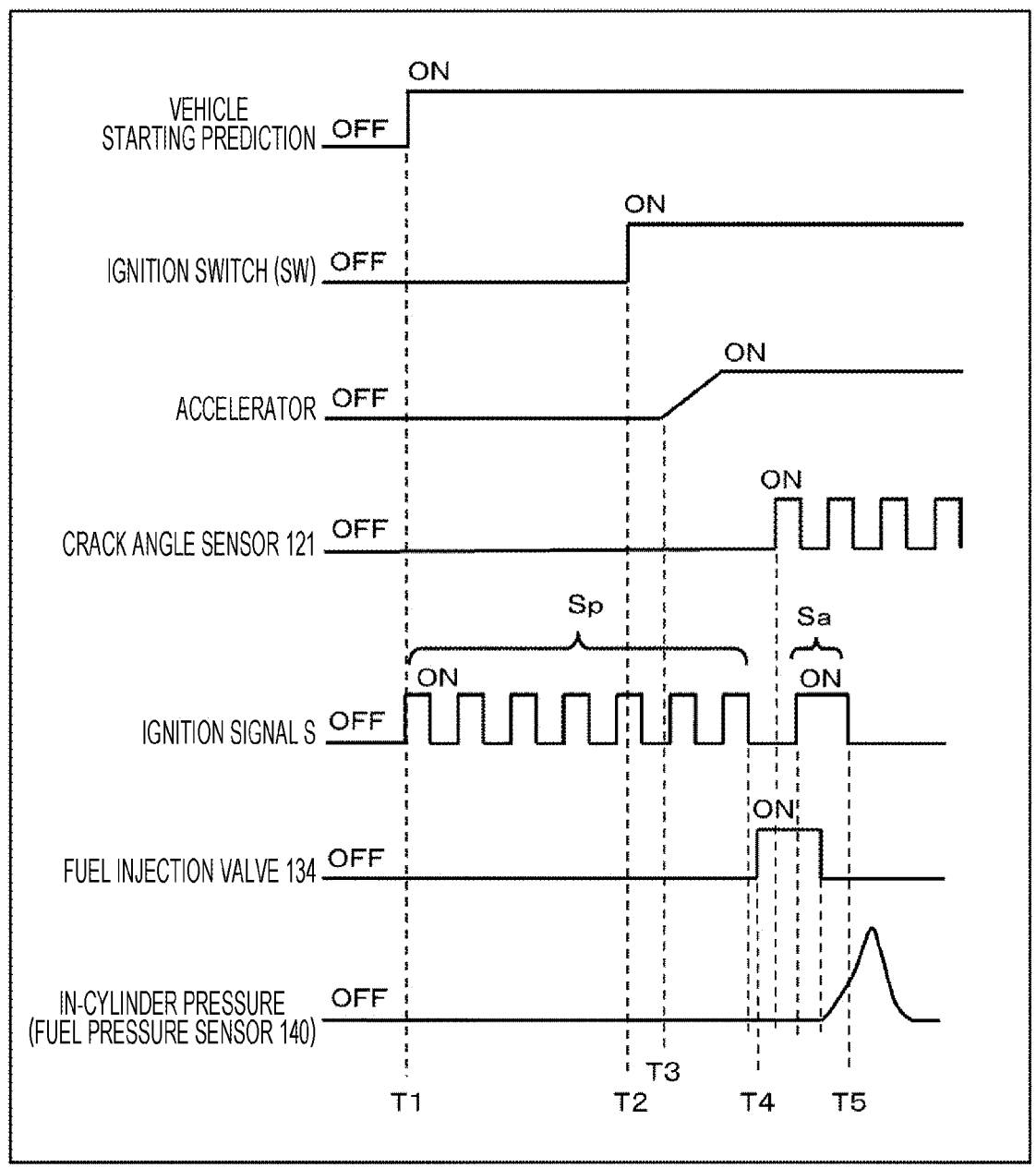
FIG. 7 is an example of a timing chart illustrating an output timing of an ignition signal according to a second embodiment.

FIG. 7 is an example of a timing chart for describing the output timing of the ignition signal according to the second embodiment.

As illustrated in FIG. 7, the ignition control unit predicts the starting (movement) of the vehicle, and outputs the preliminary ignition signal Sp a plurality of times at the predicted time T1.

The prediction of the start (driving) of the vehicle by the ignition control unit 83 may be performed by operating the brake pedal of the vehicle, opening and closing the door of the vehicle, locking the door, sitting on the driver's seat, a load of the steering wheel, presence/absence (posture) of the driver captured by an on-board camera mounted in the vehicle, a position of a smartphone owned by the driver, and a position of the key. By acquiring these pieces of information, the ignition control unit 83 can predict that the driver will drive the vehicle in the near future.

Accordingly, the ignition control unit 83 outputs and performs the preliminary ignition signal Sp a plurality of times at time T1 before time T2 when the ignition switch SW is turned on, thereby performing and completing the heating of the ignition plug 200 at an earlier stage. Therefore, even in a case where the driver drives the vehicle immediately, the ignition plug 200 can already be sufficiently heated at time T3 when the ignition switch SW is turned on and the accelerator is turned on. The amount of hydrocarbon (HC) generated at the time of cooling start can be greatly reduced.

As described above, in the second embodiment, the ignition plug 200 can be heated (preliminary overheating) before the operation of the internal combustion engine 100 is started (before the cooling start), and the air-fuel ratio at the time of combustion after the operation is started can be reduced. Therefore, the generation of hydrocarbons (HC) at the start of operation (at the time of cooling start) can be suppressed.

With this configuration, the ignition plug 200 is discharged a plurality of times before the operation of the internal combustion engine 100 is started, so that the ignition plug 200 can be overheated before the operation is started. The generation of hydrocarbons (HC) at the time of cooling start can be reliably suppressed.

Third Embodiment

Next, an ignition device for an internal combustion engine according to a third embodiment will be described.

The ignition device for an internal combustion engine according to the third embodiment differs from the above-described embodiment in that the waveform of the preliminary ignition signal Sp can be adjusted.

Figure 8:
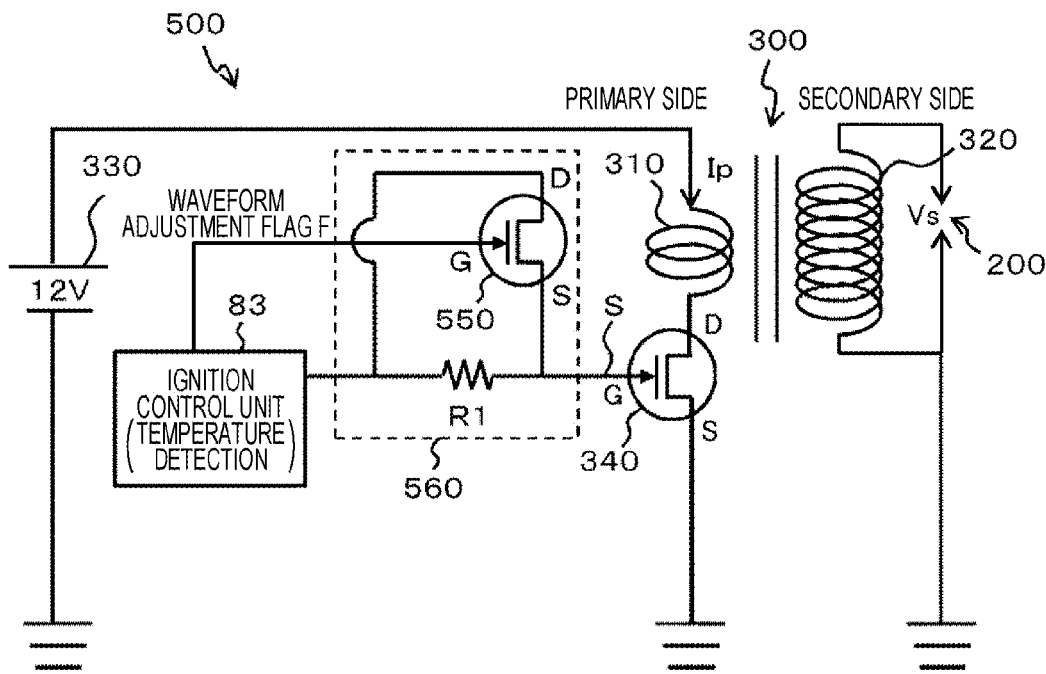
FIG. 8 is a circuit diagram for describing an example of an electric circuit of an ignition device for an internal combustion engine according to a third embodiment.

FIG. 8 is a circuit diagram for describing an example of an electric circuit 500 of the ignition device for an internal combustion engine according to the third embodiment.

Figure 9:
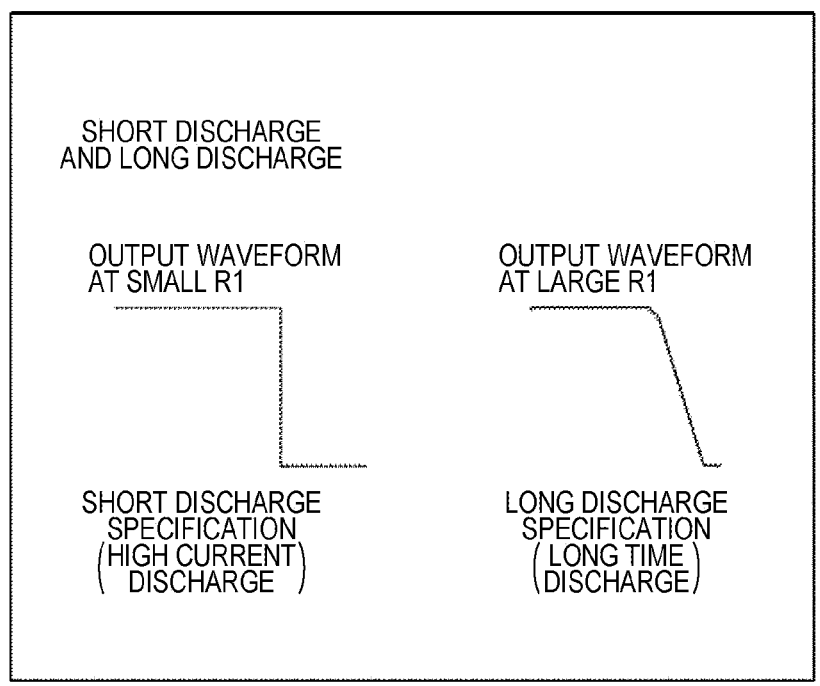
FIG. 9 is an example of a preliminary ignition signal output from an ignition control unit according to a third embodiment.

FIG. 9 is an example of the preliminary ignition signal Sp output from the ignition control unit 83 according to the third embodiment.

Figure 10:
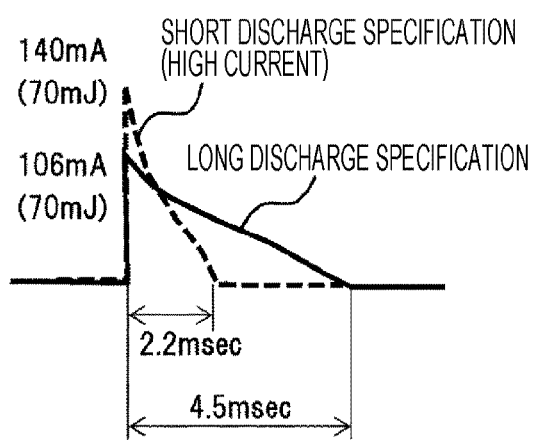
FIG. 10 is a diagram for describing one cycle of a discharge generated in an ignition coil according to the third embodiment.

FIG. 10 is a diagram for describing one cycle of a discharge generated in the ignition coil 200 according to the third embodiment.

Figure 11:
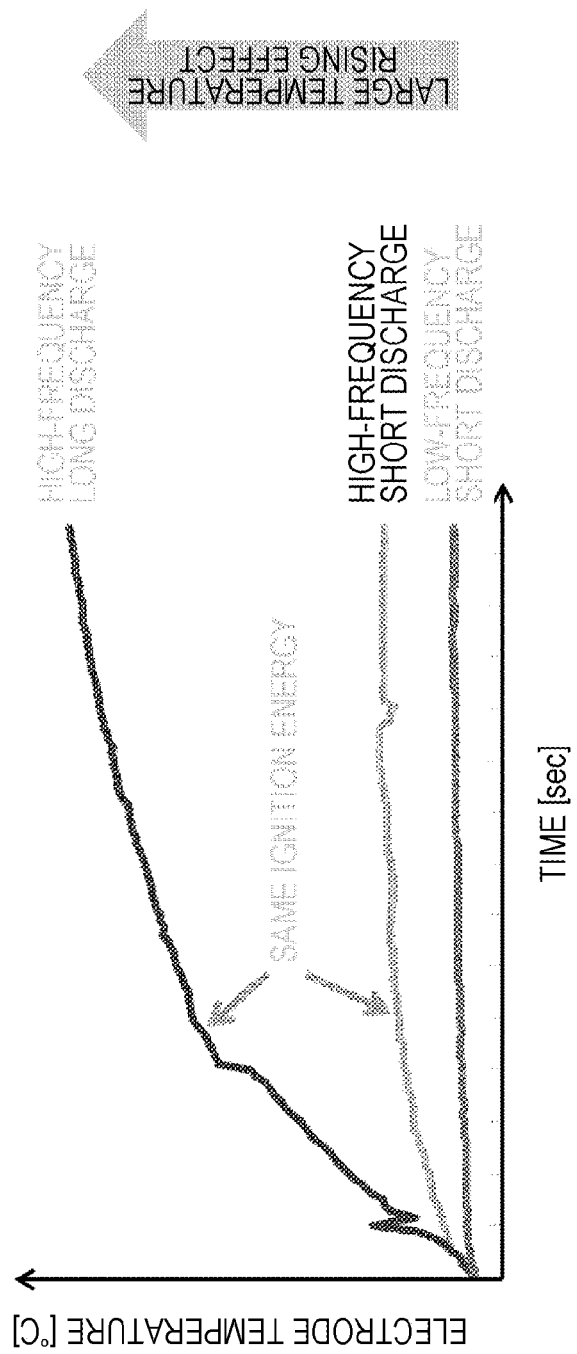
FIG. 11 is a diagram for describing a waveform of a preliminary ignition signal and an electrode temperature of an ignition plug according to the third embodiment.

FIG. 11 is a diagram for describing the waveform of the preliminary ignition signal Sa and the electrode temperature of the ignition plug 200 according to the third embodiment.

As illustrated in FIG. 8, in the electric circuit 500, the ignition coil 300 is provided which includes the primary coil 310 wound with a predetermined number of turns and a secondary coil 320 wound with a larger number of turns than the primary coil 310.

One end of the primary coil 310 is connected to a DC power source 330. Thus, a predetermined voltage (12 V in the embodiment) is applied to the primary coil 310.

The other end of the primary coil 310 is connected to the drain (D) terminal of an igniter 340, and is grounded via the source (S) terminal of the igniter 340. In the embodiment, a field effect transistor (FET) or the like is used as the igniter 340.

The gate (G) terminal of the igniter 340 is connected to the ignition control unit 83, and the ignition signal S output from the ignition control unit 83 is input to the gate (G) terminal of the igniter 340.

When the ignition signal S is input to the gate (G) terminal of the igniter 340, the drain (D) terminal and the source (S) terminal of the igniter 340 enter the energization state, and the current flows between the drain (D) terminal and the source (S) terminal. With this configuration, electric power (energy) is accumulated in the primary coil 310.

When the output of the ignition signal S from the ignition control unit 83 is stopped and the current flowing through the primary coil 310 is interrupted, a high voltage corresponding to the coil turns ratio is generated in the secondary coil 320. When the high voltage generated in the secondary coil 320 is applied to the ignition plug 200 (the center electrode 210), discharge is generated between the center electrode 210 and the outer electrode 220 of the ignition plug 200. When a discharge voltage generated between the center electrode 210 and the outer electrode 220 becomes equal to or higher than the dielectric breakdown voltage of the gas (air-fuel mixture in the cylinder 150), the gas component undergoes dielectric breakdown and is ignited.

Here, the electric circuit 500 includes a primary current control circuit 560, and the primary current control circuit 560 includes a resistor R1 and a semiconductor element 550.

In the primary current control circuit 560, the resistor R1 is provided in series with the gate (G) terminal of the igniter 340, and the semiconductor element 550 is provided in parallel with the resistor R1.

As the semiconductor element 550, a field effect transistor (FET) similar to the igniter 340 can be used. The semiconductor element 550 has a drain (D) terminal, a gate (G) terminal, and a source (S) terminal. The gate (G) terminal is connected to the ignition control unit 83, and the waveform adjustment flag F is input from the ignition control unit 83.

This waveform adjustment flag F is a signal that the ignition control unit 83 turns off or on based on the temperature of the internal combustion engine 100 itself, the cooling water temperature, and the outside air temperature. In the embodiment, the ignition control unit 83 normally turns on the waveform adjustment flag F. In a case where the temperature of the internal combustion engine 100, the cooling water temperature, and the outside air temperature are detected to be lower than a predetermined threshold temperature Tth, the waveform adjustment flag F is set to OFF.

In the semiconductor element 550, the drain (D) terminal and the source (S) terminal enter the non-energization state in a state that the waveform adjustment flag F is not input to the gate (G) terminal. If the waveform adjustment flag F is applied to the gate (G) terminal, the drain (D) terminal and the source (S) terminal enter the energization state.

In a case where the drain (D) terminal and the source (S) terminal of the semiconductor element 550 enter the non-energization state, the ignition signal S output from the ignition control unit 83 passes through the resistor R1 and is input to the gate (G) of the igniter 340. On the other hand, in a case where the drain (D) terminal and the source (S) terminal of the semiconductor element 550 are in the energization state, the ignition signal S output from the ignition control unit 83 passes through between the drain (D) terminal and the source (S) terminal of the semiconductor element 550 and is input to the gate (G) terminal of the igniter 340.

In the embodiment, in a case where it is determined that the temperature of the internal combustion engine 100 is higher than the predetermined threshold temperature Tth, the ignition control unit 83 outputs both the ignition signal S and the waveform adjustment flag F, and the drain (D) terminal and the source (S) terminal of the igniter 340 enter the energization state. Therefore, in the ignition coil 300, the current Ip flows through the primary coil 310, and during that time, electric power (energy) is accumulated in the primary coil 310.

In this state, the ignition signal S passes through the drain (D) terminal and the source (S) terminal of the semiconductor element 550 and is input to the gate (G) terminal of the igniter 340.

On the other hand, in a case where it is determined that the temperature of the internal combustion engine 100 is lower than the predetermined threshold temperature Tth, the ignition control unit 83 turns off the waveform adjustment flag F.

Then, the drain (D) terminal and the source (S) terminal of the semiconductor element 550 enter the non-energization state, and the ignition signal S from the ignition control unit 83 passes through the resistor R1 and is input to the gate (G) terminal of the igniter 340.

Here, in the igniter 340, as the resistance value connected to the gate (G) terminal is increased, the fall time of the ignition signal S due to the switching operation characteristics of the field effect transistor becomes longer.

Therefore, in the igniter 340, in a case where the temperature or the like of the internal combustion engine 100 is higher than the threshold temperature Tth and the waveform adjustment flag F is turned on, the ignition signal S output from the ignition control unit 83 passes through the drain (D) terminal and the source (S) terminal of the semiconductor element 550. Therefore, the resistor connected to the gate (G) terminal of the igniter 340 in the passage of the ignition signal S is small, and the falling waveform of the ignition signal S becomes a waveform of which the fall time illustrated in the left drawing of FIG. 9 is short.

On the other hand, in the igniter 340, in a case where the temperature or the like of the internal combustion engine 100 is lower than the threshold temperature Tth and the waveform adjustment flag F is turned off, the ignition signal S output from the ignition control unit 83 passes through the resistor R1. Therefore, the resistance connected to the gate (G) terminal of the igniter 340 in the passage of the ignition signal S is large, and the falling waveform of the ignition signal S is a gentle waveform with a long falling time illustrated in the right drawing of FIG. 9.

Therefore, in the ignition coil 300, the rate of change (decrease rate) of the current Ip flowing through the primary coil 310 decreases, so that the voltage Vs of the secondary coil 320 generated according to the decrease rate decreases, and a cycle (frequency) becomes longer.

Therefore, as illustrated in FIG. 10, in a case where the temperature or the like of the internal combustion engine 100 is lower than the threshold temperature Tth, the voltage Vs of the ignition coil 300 (the secondary coil 320) is set to a slightly long cycle, so that the discharge generated in the ignition plug 200 becomes a slightly long cycle (the solid line in FIG. 10: see long discharge specification). On the other hand, in a case where the temperature or the like of the internal combustion engine 100 is higher than the threshold temperature Tth, the voltage Vs of the ignition coil 300 (the secondary coil 320) is set to a largely short cycle, so that discharge (ignition) generated in the ignition plug 200 becomes a largely short cycle (the broken line in FIG. 10: see short discharge specification).

Further, the energy (the area of the solid waveform in FIG. 10) in a case where the discharge voltage is discharged at a slightly long cycle and the energy (the area of the broken waveform of FIG. 10) in a case where the discharge voltage is discharged at a largely short cycle have the same area, and the required energy becomes the same.

As a result, as illustrated in FIG. 10, in the ignition plug 200, in a case where the discharge is performed in a long cycle, the energization time (heating time) of the electrodes (210, 220) is longer than a case where the discharge is performed in a short cycle. The temperature rise of the electrode increases. In other words, in the ignition plug 200, when the discharge is performed in a long cycle, the cooling time during which the electrode is not heated is shortened, and the electrode is rapidly heated in a short time.

As described above, in the third embodiment, the ignition control unit 83 is configured to control at least the discharge frequency and voltage of the ignition plug 200.

With this configuration, the discharge frequency and voltage of the ignition plug 200 can be changed, and the ignition plug 200 can be efficiently heated.

In addition, the ignition control unit 83 is configured to control the discharge frequency and voltage of the ignition plug 200 based on the water temperature of the internal combustion engine 100 or the outside air temperature.

With this configuration, the discharge frequency and voltage of the ignition plug 200 can be changed according to the water temperature or the outside temperature of the internal combustion engine 100 (the ignition plug 200), and the ignition plug 200 can be efficiently heated.

Fourth Embodiment

Next, an ignition device for an internal combustion engine according to a fourth embodiment will be described.

Figure 12:
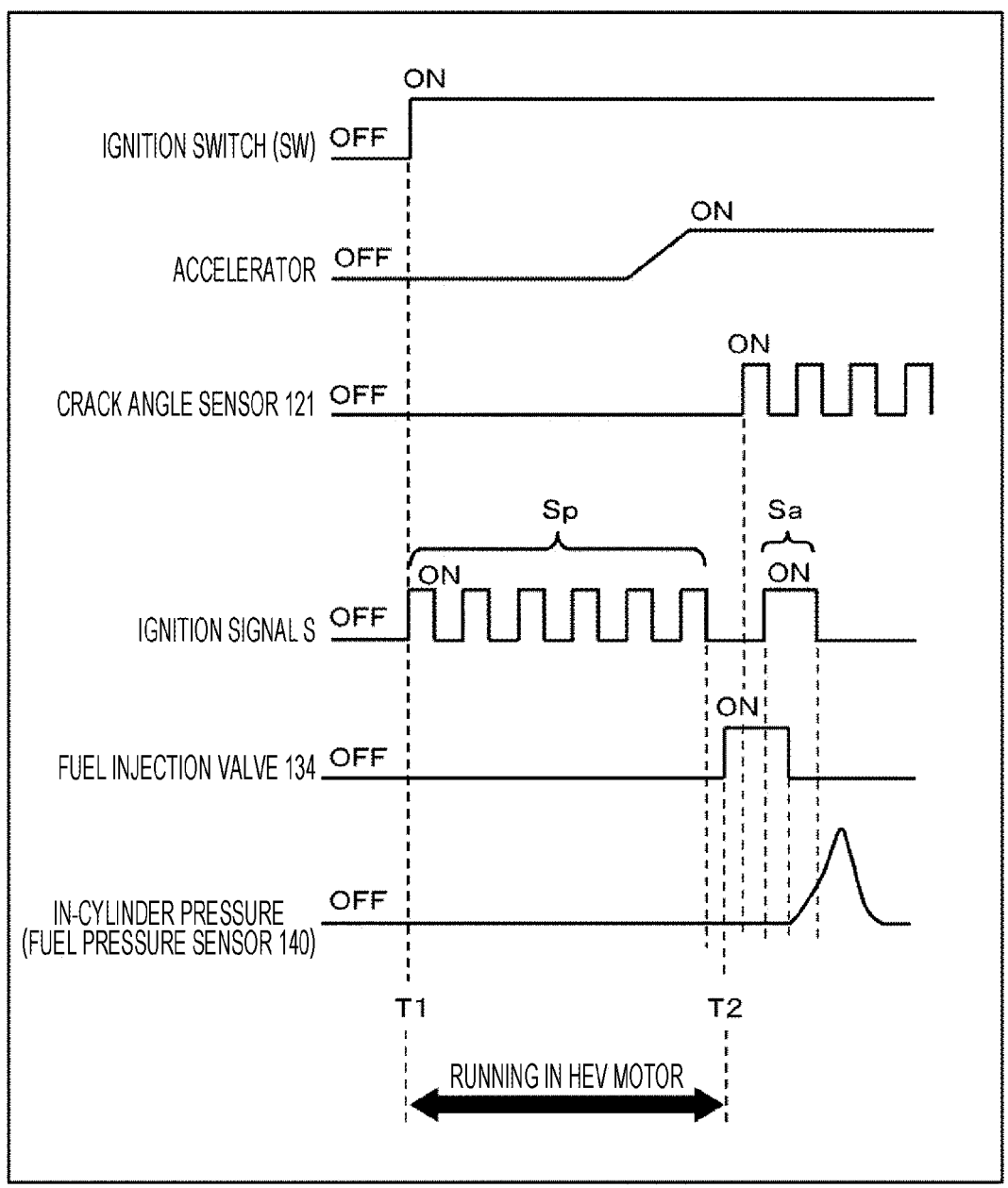
FIG. 12 is a diagram for describing an ignition device for an internal combustion engine according to a fourth embodiment.

FIG. 12 is a diagram for describing an internal combustion engine ignition device according to the fourth embodiment.

In the fourth embodiment, an example in which the internal combustion engine ignition device is used in a hybrid vehicle that combines two powers of internal combustion engine 100 and an electric motor (hereinafter, referred to as an HEV (Hybrid Electric Vehicle) motor) will be described.

As illustrated in FIG. 12, in the hybrid vehicle 900, a period from time T1 when the ignition switch SW is turned on to time T2 when heating of the ignition plug 200 by the preliminary ignition signal Sa is completed (at least before fuel is injected from the fuel injection valve 134), the vehicle runs only with the HEV motor (not illustrated).

With this configuration, the generation of a large amount of hydrocarbons (HC) due to combustion before the completion of heating of the ignition plug 200 can be reliably suppressed, and the driving behavior of the driver is not hindered.

In other words, in the hybrid vehicle, after time T1 at which the ignition switch SW is turned on, the vehicle runs with the HEV motor at least during time T2 at which fuel is injected from the fuel injection valve 134, and during which the ignition plug 200 is heated with preliminary discharge. With this configuration, in the internal combustion engine 100, the combustion in the first combustion cycle is performed after the internal combustion engine 100 is heated, so that the amount of generated hydrocarbons (HC) can be reliably suppressed.

This type of hybrid vehicle (not illustrated) is equipped with a large-capacity battery (not illustrated). Therefore, by using the ignition device for an internal combustion engine of the invention in a hybrid vehicle, even in a case where the preliminary discharge is performed at the time of cooling start of the internal combustion engine 100, the consumption amount with respect to the battery capacity is small. Therefore, there is no need to worry about insufficient battery capacity due to the preliminary discharge.

As described above, in the fourth embodiment, in the hybrid vehicle 900 (vehicle) driven by the combination of the internal combustion engine 100 and the HEV motor 600 (electric motor), the ignition control unit 83 causes the HEV motor 600 to run the hybrid vehicle 900 before the operation of the internal combustion engine 100 starts, and then the ignition plug 200 is discharged.

With such a configuration, the HEV motor 600 runs before the ignition plug 200 is heated, and during that time, the ignition plug 200 can be sufficiently heated. Therefore, it is possible to reliably overheat the ignition plug 200 before starting operation of the internal combustion engine 100 without hindering the driving behavior of the driver, so that the generation of hydrocarbons (HC) at the start of operation of the internal combustion engine 100 can be reliably suppressed.

Fifth Embodiment

Next, an ignition device for an internal combustion engine according to a fifth embodiment will be described.

Figure 13:
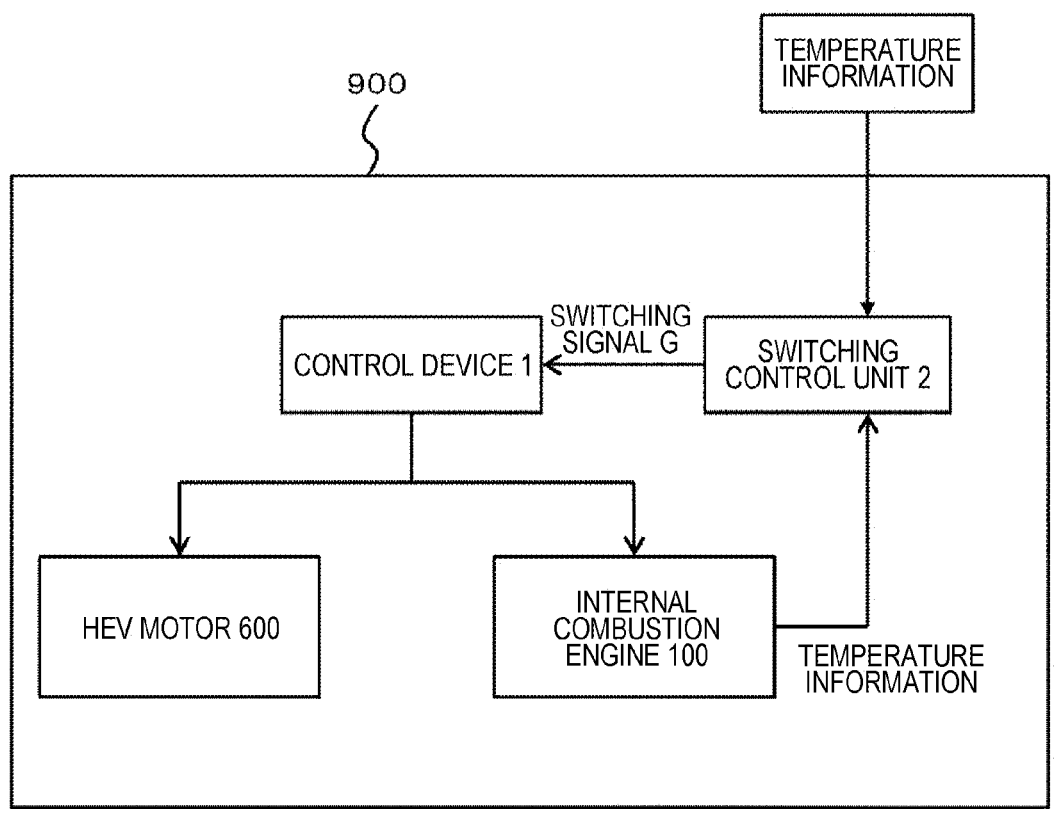
FIG. 13 is a diagram for describing an ignition device for an internal combustion engine according to a fifth embodiment.

FIG. 13 is a diagram for describing an internal combustion engine ignition device according to the fifth embodiment.

As illustrated in FIG. 13, the hybrid vehicle 900 includes two power sources of the internal combustion engine 100 and the HEV motor 600, and the control device 1 controls any one of the power sources to drive the hybrid vehicle 900.

The ignition device for an internal combustion engine according to the fifth embodiment includes a switching control unit 2. The switching control unit 2 selects whether the vehicle 900 is to be run by the HEV motor 600 or to be driven by the internal combustion engine 100, based on temperature information such as the temperature of the internal combustion engine 100 itself, the cooling water temperature, and the outside air temperature.

In a case where it is determined that the internal combustion engine 100 has been sufficiently heated by the preliminary overheating in the internal combustion engine ignition device and the temperature of the internal combustion engine 100 has exceeded a predetermined threshold temperature Tth, the switching control unit 2 outputs a switching signal G for switching to running by the HEV motor 600 to running by the engine 100 toward the control device 1.

The control device 1 switches the power source to be controlled from the HEV motor 600 to the internal combustion engine 100 based on the switching signal G transmitted from the switching control unit 2, and drives the hybrid vehicle 900 by the internal combustion engine 100.

As described above, in the fifth embodiment, a temperature measuring device is provided which measures the water temperature or the outside air temperature of the internal combustion engine 100 (such as the water temperature sensor 122 illustrated in FIG. 1). The ignition control unit 83 is configured to include the switching control unit 2 which performs a discharge of the ignition plug 200 while the hybrid vehicle is run by the HEV motor 600 before the operation of the internal combustion engine 100 starts, and switches the running by the HEV motor 600 to the running by the internal combustion engine 100 in a case where the water temperature or the outside air temperature of the internal combustion engine 100 measured by the temperature measurement device becomes equal to or higher than a predetermined threshold temperature.

With this configuration, the ignition device for an internal combustion engine includes the switching control unit 2 which determines whether to switch the power source based on the temperature information of the internal combustion engine 100 or the outside air temperature information, and can appropriately perform switching from the HEV motor 600 to the internal combustion engine 100.

Sixth Embodiment

Next, an ignition device for an internal combustion engine according to a sixth embodiment will be described.

Figure 14:
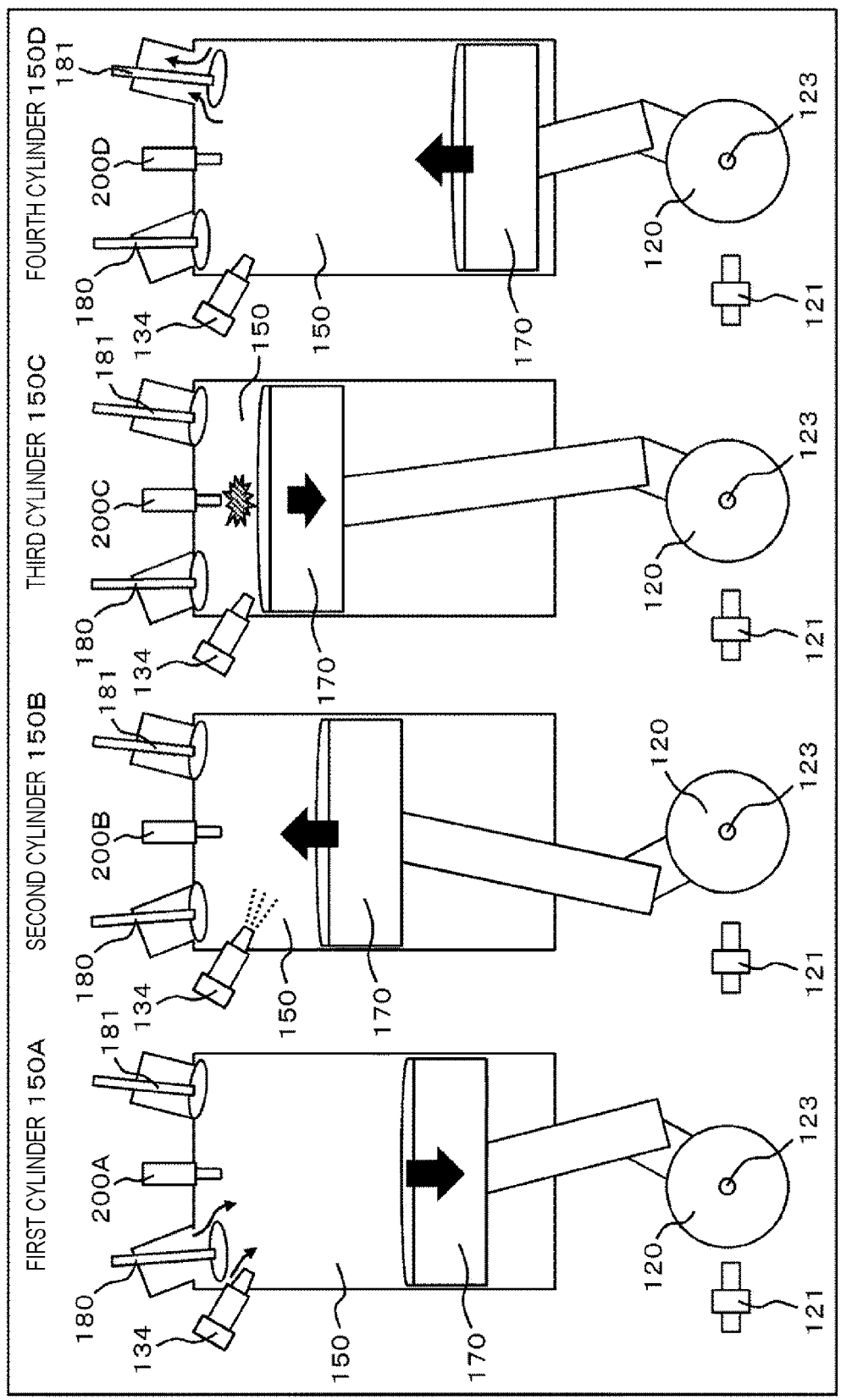
FIG. 14 is a diagram for describing an ignition device for an internal combustion engine according to a sixth embodiment.

FIG. 14 is a diagram for describing an internal combustion engine ignition device according to the sixth embodiment.

The ignition device for an internal combustion engine according to the sixth embodiment is different from the above-described embodiment in that the control of the preliminary discharge is made different according to the stroke (intake stroke, compression stroke, combustion stroke, exhaust stroke) of each cylinder 150 in the combustion cycle of the internal combustion engine 100.

In the ignition control unit 83 of the ignition device for an internal combustion engine according to the sixth embodiment, the stroke of the combustion cycle is determined for each cylinder 150 based on the crank angle of the crankshaft 123 detected by the above-described crank angle sensor 121.

The ignition control unit 83 temporarily stores the stroke of each cylinder 150 when the internal combustion engine 100 was previously stopped, in a predetermined storage area of the RAM 40 of the control device 1. This RAM 40 has a function as a stroke storage unit of the invention.

As illustrated in FIG. 14, in the embodiment, the state of the internal combustion engine 100 at the time of the previous stop is an example in a case where the first cylinder 150A is in the intake stroke, the second cylinder 150B is in the compression stroke, the third cylinder 150C is in the combustion stroke, and the cylinder 150D is in the exhaust stroke. In this case, in the current operation of the internal combustion engine 100, fuel is injected by the fuel injection valve 134 in the second cylinder 150B in the compression stroke.

In this state, the ignition control unit 83 performs a preliminary discharge in the ignition coil 200A corresponding to the first cylinder 150A, which is the previous stroke of the second cylinder 150B where fuel injection is performed.

Further, the ignition control unit 83 not only pre-discharges the ignition coil 200A corresponding to the first cylinder 150A in the previous stroke of the second cylinder 250B where fuel injection is performed, but also performs the preliminary discharge even to the ignition coils 200B and 200D corresponding to the second cylinder 150B where fuel injection is performed and the fourth cylinder 150D where the exhaust is performed.

In addition, the ignition control unit 83 may change the frequency or the voltage (power) of the discharge of the ignition coil for each cylinder in a case where the preliminary discharge is performed on the ignition coils 200A, 200B, and 200D corresponding to a plurality of cylinders (for example, the first cylinder 150A, the second cylinder 150B, and the fourth cylinder 150D) which are different in strokes.

For example, in the fourth cylinder 150D in the exhaust stroke, the gas overheated in the previous combustion stroke is exhausted, so that the discharge power of an ignition plug 200D of the fourth cylinder 150D is set to be larger than the discharge power of the other cylinders. With this configuration, even if the ignition plug 200D of the fourth cylinder 150D is cooled by the exhaust of the overheated gas, the ignition plug 200D of the fourth cylinder 150D is overheated with a larger discharge power, so that the temperature of the ignition plug 200D can be appropriately overheated. In addition, it is possible to reduce the discharge power of the ignition plug 200A of the first cylinder 150A in the intake stroke before the fuel is injected from the fuel injection valve 134 in the compression stroke. In this case, the overheating of the ignition plug 200A can be efficiently performed in consideration of energy saving.

Even in this case, in the ignition device for an internal combustion engine, the temperatures of the ignition plugs 200A to 200D can be preheated. In particular, by changing the discharge power of the ignition plugs corresponding to the cylinders having different strokes, it is possible to more appropriately overheat the ignition plugs 200A to 200D.

Further, the ignition device for an internal combustion engine of the invention can also be used for overheating an ignition plug that performs a plurality of times of discharges (multiple discharges) in one combustion cycle. In this case, the ignition plug 83 may be configured to change the frequency or the voltage for each discharge in the multiple discharge.

Specifically, in the first combustion cycle after the start of operation of the internal combustion engine 100, the ignition control unit 83 maximizes the first discharge power of the multiple discharge in which the ignition plug 200 is the coldest, and gradually reduces the discharge power while increasing with the number of times of discharges.

With this configuration, the first discharge voltage in the multiple discharge is increased, and the ignition plug 200 is overheated in a shorter time, so that the overheating of the ignition plug 200 can be performed efficiently with the discharge of the small discharge power after the multiple discharge.

In addition, the ignition control unit 83 may be configured to perform a preliminary discharge with a predetermined discharge power so as to overheat the gas in each cylinder 150. In this case, the ignition control unit 83 sets the discharge power of the ignition plug 200 based on the intake gas temperature measured by the intake air temperature sensor 115 described above.

Specifically, the ignition control unit 83 continuously performs the preliminary discharge of the ignition plug 200 a plurality of times until the intake gas temperature measured by the intake air temperature sensor 115 becomes equal to or higher than a predetermined threshold temperature. In a case where the gas temperature in the cylinder 150 exceeds a predetermined threshold temperature, the preliminary discharge of the ignition plug 200 is terminated.

With this configuration, the ignition control unit 83 can appropriately overheat the gas in each cylinder 150 together with the ignition plug based on the measurement result of the intake air temperature sensor 115. Therefore, the ignition of the gas in the fuel stroke can be performed appropriately.

In addition, the ignition control unit 83 may be configured to perform a preliminary discharge of the ignition plug 200 based on a deterioration state (State Of Health: SOH) or a residual amount of a battery used for driving the internal combustion engine 100. In this case, in a case where the battery is deteriorated or the residual amount is small, the ignition control unit 83 reduces the discharge power of the ignition plug 200 to prevent further deterioration or consumption of the battery.

With this configuration, it is possible to overheat the ignition plug 200 while securing the deteriorated state or residual amount of the battery that operates the internal combustion engine 100.

In addition, as illustrated in FIG. 13, in a case where the vehicle is the hybrid vehicle 900 running by a combination of the internal combustion engine 100 and an electric motor (for example, the HEV motor 600 illustrated in FIG. 13), generally a battery having a different voltage from the battery (power supply) used for driving the internal combustion engine 100 and the battery (power supply) used for driving the HEV motor 600 is used in the driving of the internal combustion engine 100.

Figure 15:
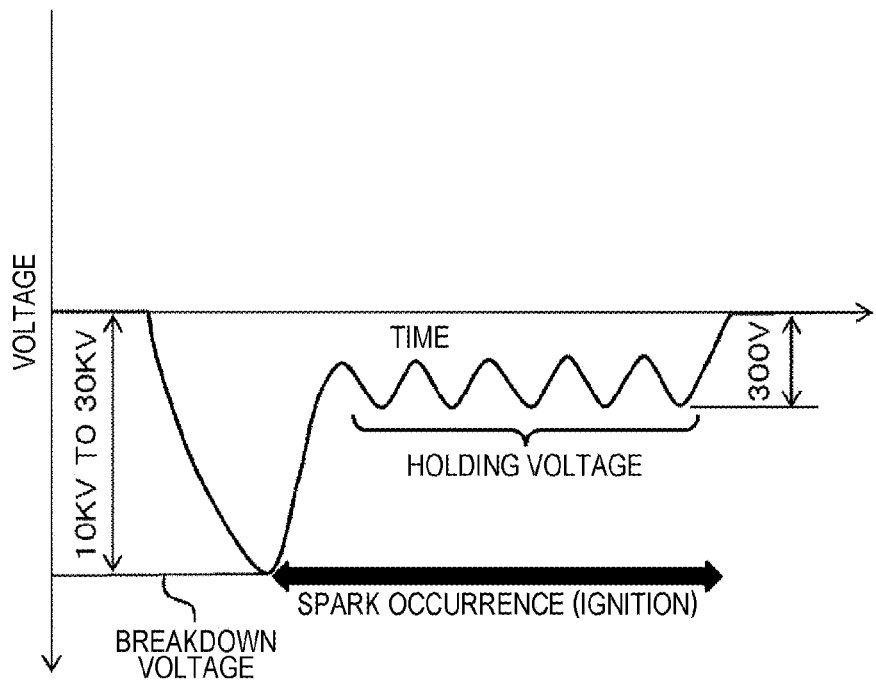
FIG. 15 is a diagram for describing ignition of an ignition plug.

FIG. 15 is a diagram for describing ignition of the ignition plug 200.

As illustrated in FIG. 15, in the ignition plug 200, a battery (for example, 12 V) used for driving the internal combustion engine 100 is used after being boosted to 10 KV to 30 KV, thereby performing ignition exceeding the dielectric breakdown voltage of the gas in the cylinder 150. However, the ignition plug 200 can continue (hold) the ignition by applying a holding voltage of about 300 V after boosting the voltage to the dielectric breakdown voltage or more.

Here, in this type of hybrid vehicle 900, a battery of about 300 V is used to drive the HEV motor 600. Therefore, the inventor of the application has found out that the ignition of the ignition plug 200 can be maintained using the battery of the HEV motor 600.

In other words, the ignition plug 200 boosts the voltage of the battery (12 V) used to drive the internal combustion engine 100 from 10 KV to 30 KV, and ignites the ignition plug 200 using that voltage (ignition at a voltage equal to or higher than the dielectric breakdown voltage). After that, the ignition of the ignition plug 200 is maintained by the battery (300 V) used for driving the HEV motor 600.

As explained above, the hybrid vehicle 900 driven by a combination of the internal combustion engine 100 and the HEV motor 600 includes a battery (first power supply) used for driving the internal combustion engine 100 and a battery used for driving the HEV motor 600. The ignition control unit 83 ignites the fuel in the cylinder 150 by discharging the ignition plug 200 using the battery (12 V) used for driving the internal combustion engine 100, and then discharges the ignition plug 200 using the battery (300 V) used for driving the HEV motor 600.

With this configuration, it is possible to suppress the consumption of the battery of the internal combustion engine 100 as compared with a case where the battery used for driving the internal combustion engine 100 is boosted and the ignition plug 200 is ignited. Therefore, deterioration of the battery of the internal combustion engine 100 can be suppressed, and the battery can be downsized as much as the battery consumption of the internal combustion engine 100 is reduced.

The control device 1 (vehicle control device) includes an ignition device for an internal combustion engine having the above-described configuration (at least a configuration including the ignition plug 200, the ignition coil 300, and the ignition control unit 83). With the ignition device for an internal combustion engine, the internal combustion engine 100 can be controlled to suppress the generation of hydrocarbons (HC) at the time of cooling start.

Hitherto, while the embodiments of the invention have been described as an example, the invention may be realized by combining all the embodiments, or by appropriately combining any two or more embodiments.

In addition, the invention is not limited to the one having all the configurations of the above-described embodiments. A part of the configuration of the above-described embodiment may be replaced with the configuration of another embodiment. In addition, the configuration of the above-described embodiment may be replaced with the configuration of another embodiment.

In addition, a part of the configuration of the above-described embodiment may be added to, deleted from, or replaced with the configuration of another embodiment.

REFERENCE SIGNS LIST 1 control device
10 analog input unit
20 digital input unit
30 A/D conversion unit
40 RAM
50 MPU
60 ROM
70 I/O port
80 output circuit
81 overall control unit
82 fuel injection control unit
83 ignition control unit
84 cylinder discrimination unit
85 angle information generation unit
86 rotation speed information generation unit
87 intake air amount measuring unit
88 load information generation unit
89 water temperature measuring unit
100 internal combustion engine
110 air cleaner
111 old period
112 intake manifold
113 throttle valve
113a throttle opening sensor
114 flow sensor
115 intake air temperature sensor
120 ring gear
121 crank angle sensor
122 water temperature sensor
123 crankshaft
125 accelerator pedal
126 accelerator position sensor
130 fuel tank
131 fuel pump
132 pressure regulator
133 fuel pipe
134 fuel injection valve
140 combustion pressure sensor
150 cylinder 160 exhaust manifold
161 three-way catalyst
162 upstream air-fuel ratio sensor
163 downstream air-fuel ratio sensor
170 piston
200 ignition plug
210 center electrode
220 outer electrode
230 insulator
300 ignition coil
310 primary coil
320 secondary coil
330 DC power source
340 igniter
400 electric circuit
500 electric circuit
550 semiconductor element
560 primary current control circuit
R1 resistor
S ignition signal
Ip primary current
Vs secondary voltage

The invention claimed is:

1. An ignition device for an internal combustion engine in a vehicle driven by a combination of the internal combustion engine and an electric motor, the ignition device comprising:
an ignition control unit that controls discharge of an ignition plug provided in a cylinder,
wherein the ignition control unit discharges the ignition plug after the vehicle is run by the electric motor before an operation of the internal combustion engine is started.

2. An ignition device for an internal combustion engine, comprising:
an ignition control unit that controls discharge of an ignition plug provided in a cylinder, and
an intake air temperature sensor which measures an intake air temperature of a gas taken into the cylinder,
wherein the ignition control unit discharges the ignition plug until an intake temperature of the gas measured by the intake air temperature sensor becomes equal to or higher than a predetermined temperature
wherein the ignition control unit discharges the ignition plug a plurality of times in a state where fuel is not injected into the cylinder from a fuel injection valve in a first combustion cycle after the operation of the internal combustion engine is started, and a frequency and a voltage are changed for each of the plurality of times of discharges.

3. An ignition device for an internal combustion engine,
wherein, in a vehicle driven by combining the internal combustion engine and an electric motor,
an ignition control unit discharges an ignition plug after the vehicle is run by the electric motor before an operation of the internal combustion engine is started.

4. The ignition device for an internal combustion engine according to claim 2,
wherein the ignition control unit controls a frequency and a voltage of discharger of the ignition plug based on a water temperature or an outside air temperature of the internal combustion engine.

5. The ignition device for an internal combustion engine according to claim 3, further comprising:
a temperature measurement device that measures a water temperature of the internal combustion engine or an outside air temperature, and
wherein the ignition control unit, before starting the operation of the internal combustion engine, discharges the ignition plug while the vehicle is running by the electric motor, and includes a switching control unit configured to switch from running by the electric motor to running by the internal combustion engine in a case where the water temperature of the internal combustion engine or the outside air temperature measured by the temperature measuring device is equal to or higher than a predetermined threshold temperature.

6. The ignition device for an internal combustion engine according to claim 5,
wherein the ignition control unit discharges the ignition plug in a state in which fuel is not injected into the cylinder from the fuel injection valve based on detection of an operation signal of the vehicle before the operation of the internal combustion engine starts.

7. The ignition device for an internal combustion engine according to claim 6, further comprising:
a stroke determination unit that determines a stroke in a combustion cycle of the cylinder; and
a stroke storage unit that stores a stroke of the cylinder determined by the stroke determination unit when the internal combustion engine has stopped operation last time,
wherein the ignition control unit discharges the ignition plug corresponding to the cylinder based on a stroke of the cylinder at the time of a previous operation stop of the internal combustion engine stored in the stroke storage unit.

8. The ignition device for an internal combustion engine according to claim 7,
wherein, in a stroke of the cylinder at the time of the previous operation stop of the internal combustion engine stored in the stroke storage unit, the ignition control unit controls a discharge power of an ignition plug corresponding to a cylinder at a position closest to a fuel injection position of the fuel injection valve in a direction opposite to the direction of the fuel cycle.

9. The ignition device for an internal combustion engine according to claim 3,
wherein the ignition control unit changes a cycle and a voltage of discharge of the ignition plug according to a deterioration state of a battery of the vehicle.

10. The ignition device for an ignition control unit according to claim 3,
wherein a first power supply used for driving the internal combustion engine, and a second power supply used for driving the electric motor are provided in a vehicle driven by combining the internal combustion engine and an electric motor, and
wherein, after igniting fuel in the cylinder by discharge of the ignition plug using the first power supply, the ignition control unit discharges the ignition plug using the second power supply.

11. A control device for a vehicle, comprising:
an ignition device for an internal combustion engine according to claim 1.

* * * * *